United States Patent
Parnafes et al.

(10) Patent No.: US 6,721,272 B1
(45) Date of Patent: Apr. 13, 2004

(54) METHOD AND APPARATUS FOR GENERATING AN RSVP MESSAGE FOR A NON-RSVP-ENABLED NETWORK DEVICE

(75) Inventors: Itzhak Parnafes, Cupertino, CA (US); Shai Mohaban, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/415,952

(22) Filed: Oct. 8, 1999

(51) Int. Cl.[7] ............................................. G08C 15/00
(52) U.S. Cl. ...................................... 370/235; 370/410
(58) Field of Search ................................. 370/230, 235, 370/351, 352, 356, 410

(56) References Cited

U.S. PATENT DOCUMENTS

| | | | | |
|---|---|---|---|---|
| 5,388,097 A | * | 2/1995 | Baugher et al. | 370/455 |
| 6,073,175 A | * | 6/2000 | Tavs et al. | 709/240 |
| 6,101,549 A | * | 8/2000 | Baugher et al. | 709/240 |
| 6,449,251 B1 | * | 9/2002 | Awadallah et al. | 370/229 |
| 6,459,682 B1 | * | 10/2002 | Ellesson et al. | 370/235 |

* cited by examiner

Primary Examiner—Chi Pham
Assistant Examiner—Keith M. George
(74) Attorney, Agent, or Firm—Hickman Palermo Truong & Becker LLP (57) ABSTRACT

A method and apparatus for providing RSVP capability for senders that either cannot or do not initiate RSVP processes is provided. An RSVP proxy is connected between a sender device and a receiver device on a computer network. The RSVP proxy detects a new traffic flow and determines whether an RSVP PATH message is appropriate for the traffic flow. If it is so determined, the RSVP proxy generates and communicates the RSVP PATH message through the network to the receiver device. The appropriateness of an RSVP PATH message can be based upon predetermined relationships or logic involving one or more of network parameters, transport parameters, and characteristics of the traffic flow, whether another RSVP signal is detected associated with the traffic flow, and other traffic flow attributes determined from decoding the traffic flow packets. The RSVP proxy can also interface with a policy server on the network to facilitate generation of the RSVP PATH message according to one or more of the traffic flow attributes. Alternatively, the RSVP proxy can include the policy server functionality itself.

28 Claims, 5 Drawing Sheets

METHOD AND APPARATUS FOR GENERATING AN RSVP MESSAGE FOR A NON-RSVP-ENABLED NETWORK DEVICE

FIELD OF THE INVENTION

The present invention relates generally to computer networks, and relates more specifically to a method and apparatus for initiating an RSVP resource reservation process for a traffic flow originating from a network device that is not enabled to do so itself. More specifically, the present invention relates to generating an RSVP PATH message for such a traffic flow.

BACKGROUND OF THE INVENTION

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork known as the Internet.

Each network entity preferably includes network communication software, which may operate in accordance with Transport Control Protocol/Internet Protocol (TCP/IP) or some other suitable protocol. A protocol generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP which is a reliable, connection-oriented transport protocol. When a process at one network entity (source) wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports (i.e., logical network interfaces ("LI" or "interfaces")) that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which, in TCP/IP networks, corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

QUALITY OF SERVICE (QoS)

The processes executing at network entities (e.g., Internet hosts) may generate hundreds or thousands of traffic flows that are transmitted across a network. Generally, a traffic flow is a set of messages (frames and/or packets) that typically correspond to a particular task, transaction, or operation (e.g., a print transaction), may be associated with an application, and may be identified by various network and transport parameters such as source and destination IP addresses, source and destination TCP/UDP port numbers, and transport protocol.

Computer networks typically include numerous services and resources for use in moving traffic flows throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc. Each port/logical network interface (LI) of a network device can provide a different service or resource. For ease of explanation, the term "network device," unless expressly stated otherwise, herein refers to the device in its entirety or one or more ports/LIs.

To maximize the transit performance of a traffic flow across a network, a desired quality of service (QoS) can be requested. For a given traffic flow, a desired QoS can be designated for each of various aspects of the traffic flow treatment across the network (i.e., how various services and resources of the network interact with the traffic flow as it travels across the network).

RESERVATION OF NETWORK RESOURCES

To obtain desired qualities of service (QoS), mechanisms can be used to reserve resources across a network along a path between a source and destination of a traffic flow. For example, the Resource Reservation Protocol (RSVP) provides a mechanism by which such resource reservations can be made. When both the source and destination are capable of utilizing RSVP (i.e., RSVP-enabled), the source generates and sends a PATH message along an intended path to the destination (i.e., intended receiver). The PATH message can specify the various characteristics of the traffic flow that is to be sent. The destination device can then establish the resource reservation in RSVP-enabled network devices along the intended path by sending back a RESV message. Additional information regarding RSVP can be found, for example, in *Internetworking Technologies Handbook*, Macmillan Technical Publishing (1998). The RSVP mechanism can be used with multicast or unicast traffic flows. The discussions herein are equally applicable to both with suitable modification.

Some sources of traffic flows are not designed, or are otherwise unable to start a reservation process with a PATH message as discussed above. For example, the source may be non-RSVP-enabled, not trusted, or merely designed or utilized so as not to bear the burden of handling the issue. RSVP signaling can require a large and complex protocol stack, with heavy demands on the source with respect to the memory footprint, O/S capabilities, and CPU load. By not including appropriate capabilities on network devices, the cost of such devices can be minimized. Providing large volumes of such less expensive devices, especially consumer-oriented end devices, can be attractive to device manufacturers. An example of such devices is an IP phone. However, when applications or other sources on such lower capability devices originate a traffic flow, the RSVP mechanism of providing QoS for the traffic flow cannot be utilized. Unfortunately, to provide services, such as carrying voice over IP, of desirable quality, RSVP capability can be critical. Yet upgrading such devices to support RSVP can prohibitively increase the cost of the devices.

Therefore, a mechanism for generating and communicating an RSVP PATH message for a traffic flow from a non-RSVP-enabled source is needed.

In particular, there is a need to provide such a system and method with minimal cost and complexity and maximum efficiency.

SUMMARY OF THE INVENTION

The foregoing objects and advantages, and other objects and advantages that will become apparent from the following description, are achieved by the present invention.

In one aspect of the present invention, a method of initiating a reservation process using Resource Reservation Protocol (RSVP), for a traffic flow in a communication network originating from a source that is not able to initiate an RSVP reservation process for the traffic flow. The method includes detecting a traffic flow directed from the source to a receiver of the traffic flow, and determining whether to initiate an RSVP reservation process for the traffic flow. The method also includes generating an RSVP PATH message associated with the traffic flow, as well as communicating the RSVP PATH message to the receiver of the traffic flow. The method can also include determining device and traffic parameters associated with the traffic flow, wherein generating the RSVP PATH message is based, at least in part, on at least one of the device and traffic parameters. Further, the method can include identifying and acquiring a predetermined policy and generating the RSVP PATH message based, at least in part, on the predetermined policy.

In another aspect of the present invention, a computer readable medium contains program instructions for initiating a reservation process using Resource Reservation Protocol (RSVP), for a traffic flow in a communication network originating from a source that is not able to initiate an RSVP reservation process for the traffic flow, wherein when the computer readable medium is read by a computer system having a processor and memory, the program instructions are configured to be executed by the processor. The computer readable medium includes program instructions for detecting a traffic flow directed from the source to a receiver of the traffic flow, and program instructions for determining whether to initiate an RSVP reservation process for the traffic flow. In addition, the computer readable medium includes program instructions for generating an RSVP PATH message associated with the traffic flow, and program instructions for communicating the RSVP PATH message to the receiver of the traffic flow.

In a yet another aspect of the present invention, a system for initiating a reservation process using Resource Reservation Protocol (RSVP), for a traffic flow in a communication network originating from a source that is not able to initiate an RSVP reservation process for the traffic flow, includes an RSVP proxy configured to be networked with a sender device and with a receiver device, where the sender device is configured to originate a traffic flow and send the traffic flow to a receiver device. The RSVP proxy includes a detector configured to detect the traffic flow directed from the source to the receiver device, when the detector is networked with the sender and receiver devices. In addition, the RSVP proxy includes an analyzer configured to determine attributes of the traffic flow when networked with the sender and receiver devices, as well as an RSVP PATH message generator.

Other features and aspects will become apparent from the following detailed description.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus is described for generating and communicating an RSVP PATH message associated with a traffic flow that has originated from a source that is not enabled to initiate an RSVP reservation process by generating a PATH message itself. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

PROXY SYSTEM

Figure 1:
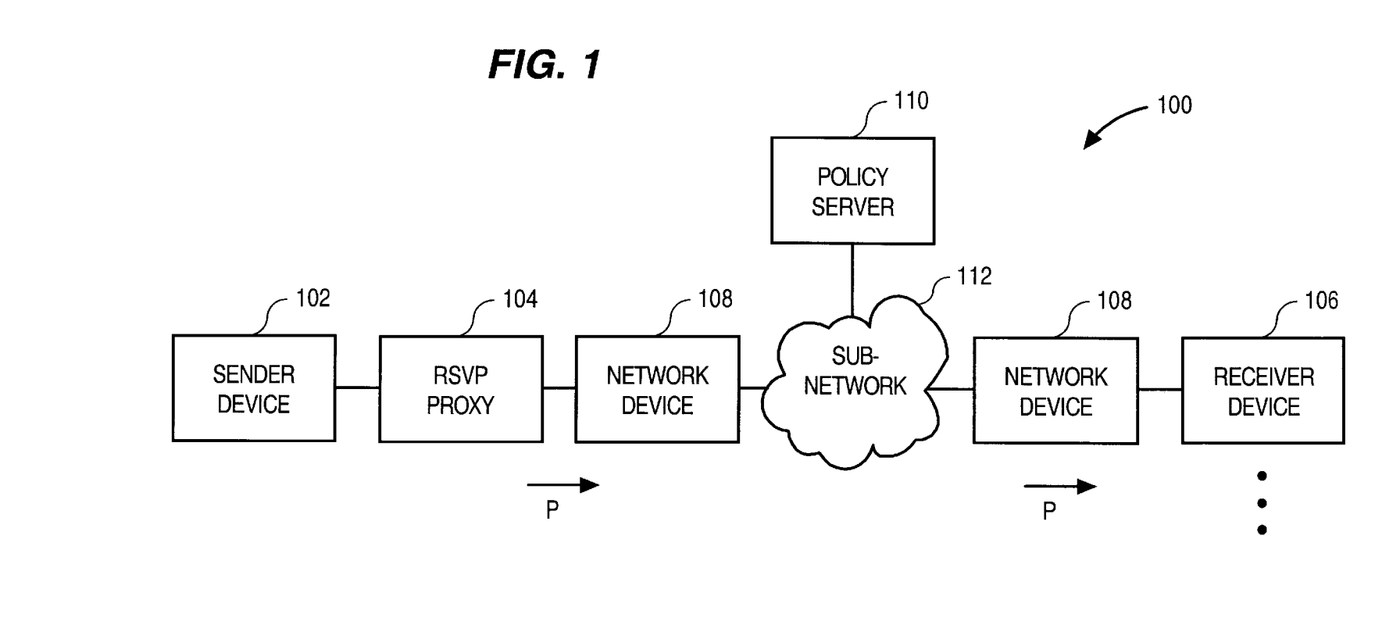
FIG. 1 is a block diagram of a network including an RSVP proxy.
Figure 2:
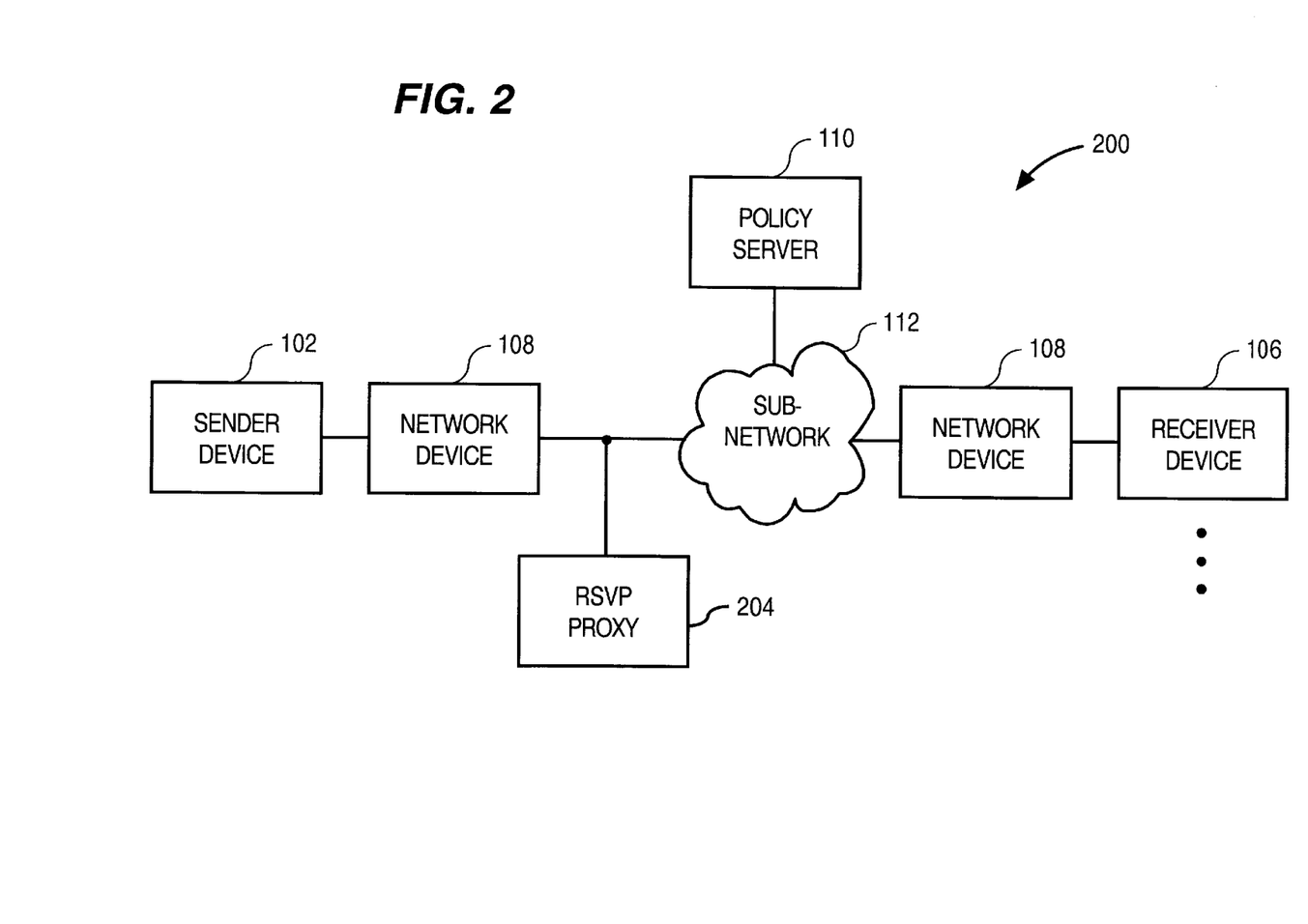
FIG. 2 is a block diagram of an alternative network including an RSVP proxy.

FIG. 1 and FIG. 2 are block diagrams of exemplary computer networks configured to facilitate the reservation of network resources, according to RSVP, for a traffic flow originating from a source that is not capable of initiating such a reservation itself.

The network 100 of FIG. 1 includes a sender device 102, an RSVP proxy 104, one or more receiver devices 106, one or more network devices 108, a policy server 110, and the remainder of the network, or sub-network 112 which may include one or more additional network devices. Each of these components are connected to each other, directly or indirectly, physically or otherwise. RSVP proxy 104 is connected so as to receive information passed from the sender device 102 to the receiver device 106 (either physically in the path as shown here, or able to sniff traffic, as in FIG. 2 described below). While the RSVP proxy 104 is shown with no network devices between it and the sender device 102, one or more network devices can be connected between it and the sender device 102. Similarly, none or any number of network devices can be connected between the RSVP proxy 104 and the receiver device 106.

The sender device 102 is any suitable network device that includes a source that can generate a traffic flow along the path P, but is not enabled to generate an RSVP PATH message to initiate an associated resource reservation process ("non-RSVP-enabled"). Such a source can be, for example, an IP telephone.

One or more network devices 108 and the remainder of the network, or subnetwork 112, can be located along a traffic flow path (indicated by the arrows P) between the sender device 102 and the one or more receiver devices 106. One or more of the network devices 108 and the devices of subnetwork 112 can be configured to reserve resources on the network or subnetwork in accordance with RSVP.

The one or more receiver devices 106 can be any suitable network devices that can be the intended destination device of a traffic flow originated by the sender device 102. If the traffic flow is unicast, only one receiver device 106 will be along the traffic flow path P, while more than one receiver device 106 may be included if the traffic flow is multicast.

The RSVP proxy 104 is located in the network so that it can detect new traffic flows sent by the sender device. In FIG. 1 this location is on the traffic flow path P (i.e., as an intermediate gateway in the flow's route) and the new traffic flows pass through the RSVP proxy. For example, the RSVP proxy 104 can be located at the first switch or router to which the sender device is connected. Such a device can also be configured to detect an RSVP signal already associated with the traffic flow (e.g., the source is RSVP-enabled) and the network and transport parameters (e.g., source and destination IP addresses and port numbers, and the transport protocol).

Additionally or alternatively, the RSVP proxy 104 can be configured to inspect underlying packets of the traffic flow to determine more information, or attributes, about the flow, for example application-specific information. As a specific example, when the source is a video or voice application (e.g., the traffic flow is a voice session initiated by an IP phone), the RSVP proxy intercepts the call setup protocol associated with the traffic flow. From the call setup protocol, the RSVP proxy determines the codec (voice encoder/decoder) then in use with the voice session, as well as other call attributes such as the user names, importance of the call, etc. From this information, the RSVP proxy determines what bandwidth and other QoS parameters (e.g., peak rate, maximum packet size, jitter, etc.) are required in the RSVP PATH message. As another specific example, when the traffic flow involves the FTP protocol, the RSVP proxy detects the user name, file name, file size, etc.

The RSVP proxy 104 is also configured to determine whether it is desirable to generate and communicate an RSVP PATH message along the traffic flow path P, and associated with the detected traffic flow. Such configuration can include predetermined relationships and/or logic based on values of network and transport parameters of the traffic flow, the presence of a RSVP signal already associated with the traffic flow, and/or other detected attributes of the traffic flow. One or more of the parameter values can then be used to decide whether to initiate RSVP signaling for the flow. For example, in the case of a traffic flow configured according to the FTP protocol, a pre-defined policy can indicate that only files with specific names and specific sizes transferred by specific users should receive special treatment, and therefore should have an RSVP PATH message generated.

In some embodiments, the RSVP proxy is not configured to determine whether an RSVP PATH message is needed. For example, such capability may not be needed if the RSVP encounters traffic flows from only sources which are not RSVP-enabled. Using such an RSVP proxy would benefit from appropriate placement within the network, and/or appropriate configuration, such that the proxy encounters only traffic flows that are not associated with an RSVP PATH message.

As shown in FIG. 1, the policy server 110 is located on the network, but is not necessarily located along the traffic flow path P. The policy server 110 can be any suitable device that can include one or more policies associated with one or more attributes of traffic flows and/or other network attributes. In other words, the policy server 110 can include predetermined relationships or logic that can define an appropriate policy or policies in accordance with the one or more attributes of a traffic flow. In this case, the policy server 110 can be configured to return an appropriate policy for generating and communicating the RSVP PATH message, based on the network parameters, transport parameters, and characteristics of the traffic flow and on traffic parameters.

As an example related to traffic flow involving the FTP protocol, a policy can be predefined indicating that only files with specific names and specific sizes transferred by specific users should get special treatment, and therefore should have an RSVP PATH message generated. The policy server 110 can be dedicated to the RSVP proxy operation, or can also provide policies for other aspects of the network 100 operation. While the policy server 110 is depicted in FIG. 1 as a device separate from the RSVP proxy 104, the policy server 110 or its equivalent alternatively or additionally can reside on the RSVP proxy device 104.

FIG. 2 depicts a block diagram of another network 200 according to another embodiment of the present invention. Each of the elements of the network 200 are substantially the same as those described above with reference to FIG. 1, with the exception of the RSVP proxy 204.

RSVP proxy 204 is connected to a shared medium along the path P and is not located directly in the traffic flow path P. For example, the RSVP proxy 204 is located at an external host on the same shared media (e.g., Ethernet) as the sender device, or such a host connected to a spanning port of the switch to which the sender is connected. Alternatively, the RSVP proxy 204 is located at an ingress point into a different network (e.g., into an ISP, or to a WAN connection). The RSVP proxy 204 can operate as a packet sniffer to detect new traffic flows that pass through it, as well as network parameters, transport parameters, and/or another RSVP signal associated with the traffic flow.

As with the RSVP proxy 104 discussed above, the RSVP proxy 204 can be configured to detect characteristics of the traffic flow, such as its rate, size of packets, etc., in addition to traffic parameters. The RSVP proxy 204 is also configured to determine whether it is desirable to generate and communicate an RSVP PATH message, associated with the detected traffic flow, along the traffic flow path P. Such configuration can include predetermined relationships and/or logic correlating the network and transport parameters of the traffic flow, the presence of another RSVP signal associated with the traffic flow, and/or detected characteristics of the traffic flow.

Additionally or alternatively, the RSVP proxy 204 can be configured to inspect underlying packets of the traffic flow to determine more information about the flow as described above with reference to RSVP proxy 104 of FIG. 1. The RSVP proxy 204 can be further capable of using such additional information with the above-described predetermined and detected information to determine whether to generate and communicate an RSVP PATH message.

The foregoing configurations provide the benefits of RSVP resource reservation to end devices that are not themselves configured to initiate such a process. In particular, with the inclusion of a single separate such device, these benefits are provided inexpensively and without increasing the complexity or cost of the end device. Furthermore, a single such RSVP proxy device can be included in the paths of traffic flows from more than one sender device, thus magnifying the complexity and cost savings over what would be required to provide the same capabilities directly to the various end devices themselves.

FUNCTIONALITY

Figure 3:
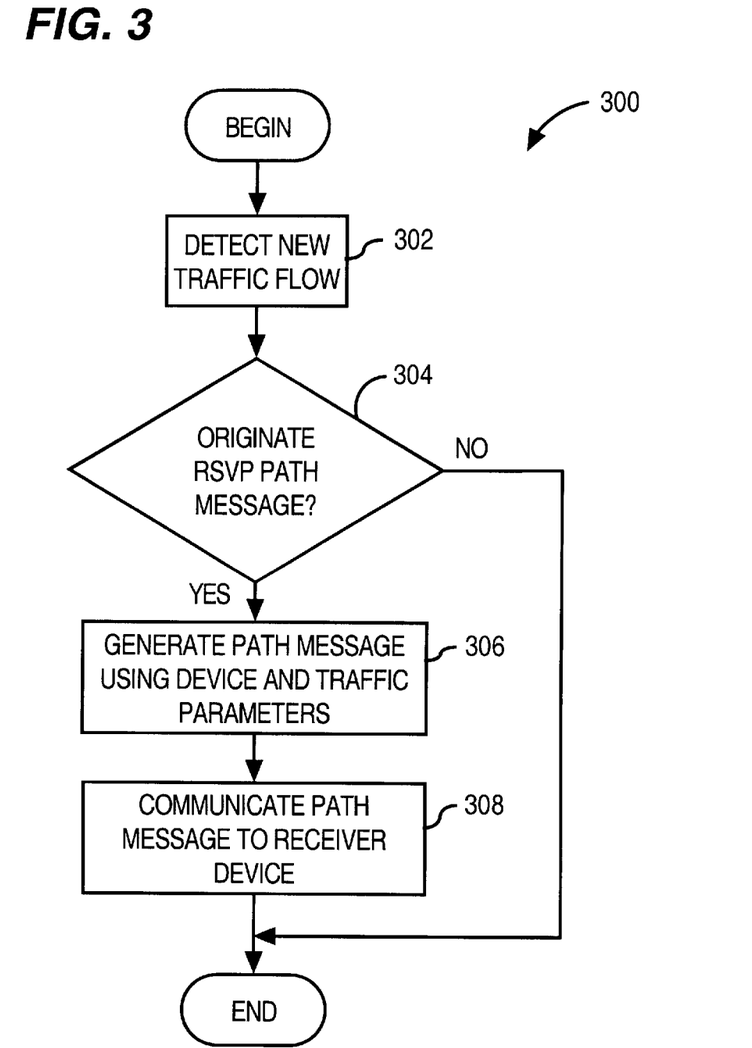
FIG. 3 is a flow diagram of a method for generating and communicating an RSVP PATH message for a traffic flow from a non-RSVP-enabled source.

FIG. 3 is a flow diagram of an example of a method for initiating an RSVP, resource reservation process for a traffic flow originating from a network device that is not enabled to do so itself. In exemplary method 300, a new traffic flow, associated with a sender device and an intended receiver device, is detected in operation 302. This can be done by detecting and analyzing traffic flows directly, or indirectly with a packet sniffer function.

In operation 304, the method determines whether it is appropriate or desired to send an RSVP PATH message, associated with the traffic flow, on behalf of the traffic flow sender. This determination is further described below with reference to FIG. 4. In embodiments where the RSVP is not configured to determine whether an RSVP PATH message is needed, operation 304 need not be performed.

If the method determines in operation 304 that an RSVP PATH message is appropriate or desired (or operation 304 is not performed because the RSVP is not configured to determine whether an RSVP PATH message is needed), such a message, associated with the traffic flow, is generated in operation 306.

In operation 308 the RSVP PATH message generated in operation 306 is communicated along the traffic flow path to the intended receiver device. Generally, the RSVP PATH message thereafter will be communicated only through the sub-path between the proxy (or its sniffing location along the sender-receiver path) and the receiver device. In such a case, the ensuing RESV message sent by the receiver will produce reservations only in the network devices of the sub-path, and not in the network devices between the RSVP proxy and the sender device. Therefore, it is desirable to locate the RSVP proxy as close as possible to the sender device.

Figure 4:
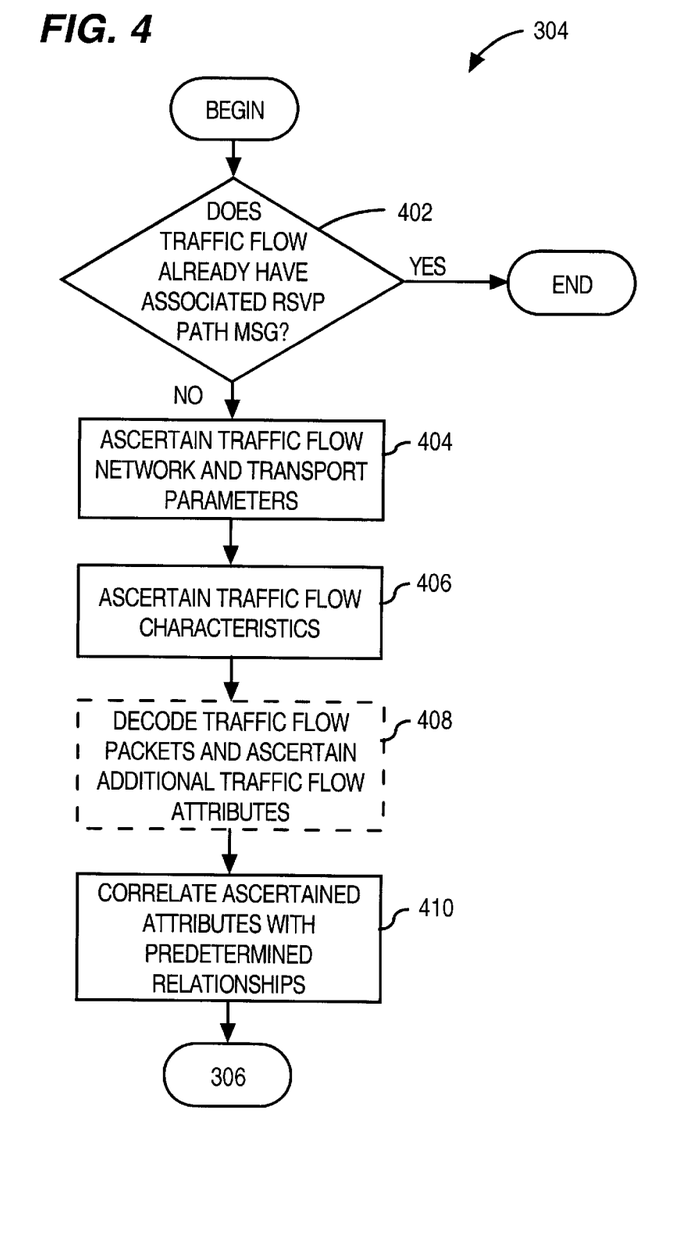
FIG. 4 is a flow diagram of certain operations of the method of FIG. 3.

FIG. 4 is a flow diagram of an example of operations that may be included in operation 304 of method 300 in FIG. 3.

In operation 402, the method determines whether the traffic flow is or already has been associated with an RSVP PATH message. Such may occur when the traffic flow source is RSVP-enabled and has already generated and communicated an RSVP PATH message associated with the traffic flow detected in operation 302 of FIG. 3. Also, an RSVP PATH message may already exist if method 300 has already been performed for the traffic flow in accordance with the present invention, earlier in the traffic flow path. If there is already an associated RSVP PATH message, the method ends or control is passed to other processes. In alternative embodiments, if the traffic flow is already associated with an RSVP PATH message, the RSVP proxy can override that message with its own RSVP PATH message, depending upon predefined policies (i.e., logic, relationships, rules, etc.). Such policies can reside on the RSVP proxy itself, or on at an external policy decision point or policy server.

If no associated RSVP PATH message is detected, network and transport parameters of the traffic flow are ascertained in operation 404. For example, the source and destination IP addresses and port numbers, and transport protocol can be ascertained. In operation 406, the method determines characteristics of the traffic flow, such as its rate, size of its packets, etc.

In some embodiments, operation 304 includes decoding one or more packets of the traffic flow and ascertaining additional traffic flow attributes, in addition to or as an alternative to one or more of operations 404 and 406 described above. For example, underlying packets can be decoded to determine application-specific information about the flow, as described above with reference to FIG. 1. The attributes ascertained in operation 304 are correlated with predetermined relationships and/or logic in operation 410, resulting in a determination of whether generation and communication of an RSVP PATH message is appropriate. For example, where the sender device is an IP phone using a given control protocol, such as H.323, to communicate with a gatekeeper receiver device, the RSVP proxy can parse such messages and determine that a given user is going to start a voice and/or video session with another user, using a specific compression algorithm or codec. The RSVP proxy therefore has information indicating what resources are necessary and can check the various parameters (e.g., the user names and the required bandwidth) against predefined policies to decide whether to generate the RSVP policies. As a more specific example, such policies could be similar to the following:

"If sender is X and receiver is Y, then initiate a reservation;" OR

"If codec is G.723, then do not initiate a reservation."

Similar relationships and/or logic can be based on other parameters such as a file size, URL, etc.

In some embodiments, the correlation of operation 410 is performed in conjunction with a policy server or external policy decision point ("PDP"). Based on the information provided by the RSVP proxy and policies resident on the policy server, the policy server can return the relationships/logic to the RSVP proxy, and/or can itself make and return the determination of whether an RSVP PATH message is needed.

HARDWARE OVERVIEW

Figure 5:
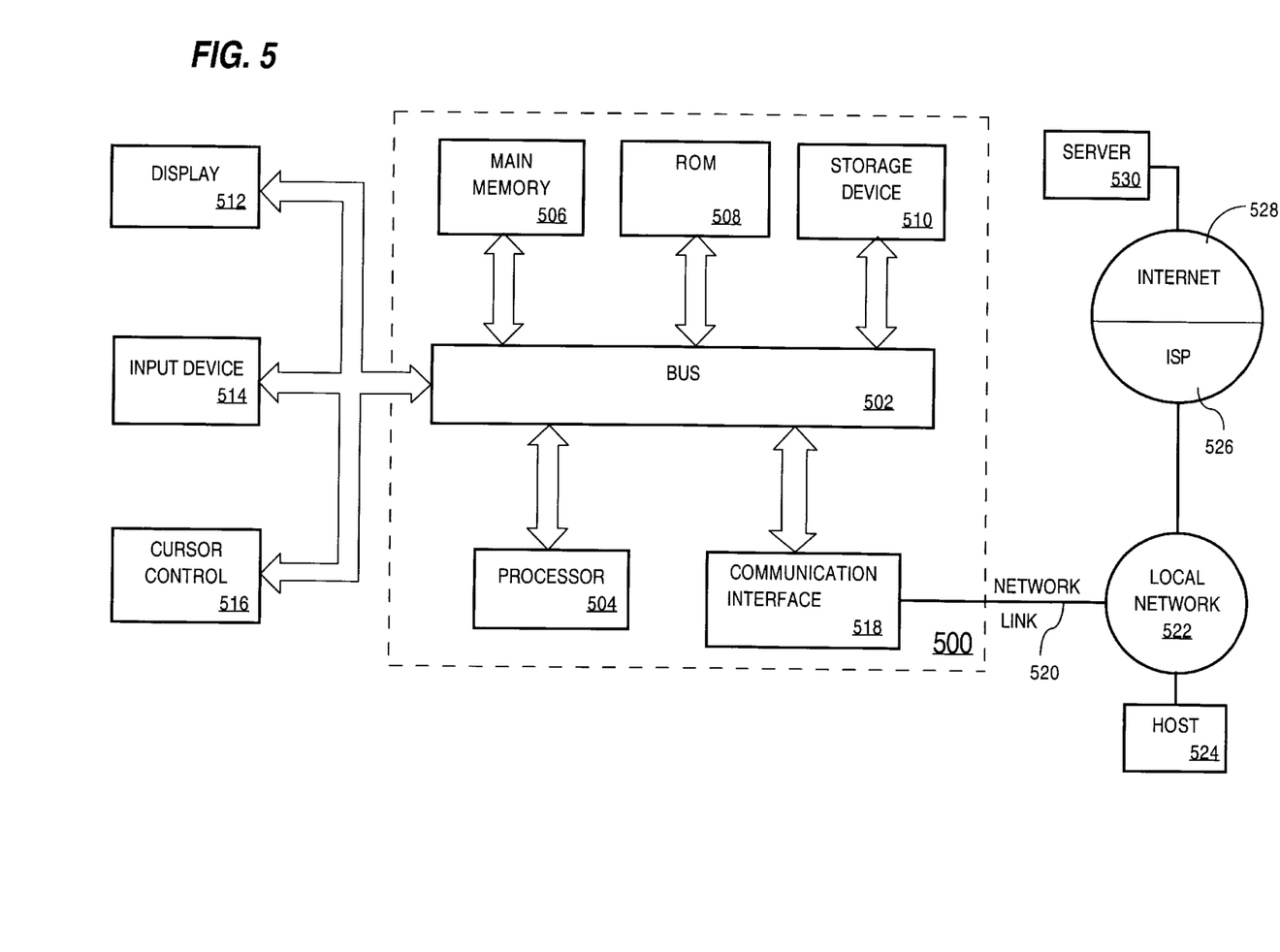
FIG. 5 is a block diagram of a computer system with which an embodiment may be carried out.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for providing RSVP process initiation for sources that do not otherwise do so alone. According to one embodiment of the invention, providing RSVP process initiation for sources that do not otherwise do so alone is facilitated by computer system 500 in response to processor 504 executing one or more sequences of one or more instructions contained in main memory 506. Such instructions may be read into main memory 506 from another computerreadable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510: Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable-media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for policy-based management of quality of service treatments of network data traffic flows by integrating policies with application programs as described herein.

The received code may be executed by processor 504 as it is received, and/or stored in storage device 510, or other non-volatile storage for later execution. In this manner, computer system 500 may obtain application code in the form of a carrier wave.

SCOPE

The above described aspects provide a simple, efficient, low-cost mechanism for using RSVP in traffic flows through a network when the sources of such traffic flows are not designed, or are otherwise unable, to start a reservation process with an RSVP PATH message. Thus, RSVP resource scheduling can be used with traffic flows from sources that are non-RSVP-enabled, not trusted, or spared the burden of such tasks, by design or usage.

Furthermore, some devices can be less expensive when non-RSVP-enabled. With the foregoing aspects, such less expensive devices can be used while still providing desired QoS. In addition, when a single such RSVP proxy device is included in the paths of traffic flows from more than one sender device, the complexity and cost savings over what would be required to provide the same capabilities directly to the various end devices themselves, are magnified.

The invention has been described herein in terms of several specific embodiments. Other embodiments of the invention, including alternatives, modifications, permutations and equivalents of the embodiments described herein, will be apparent to those skilled in the art from consideration of the specification, study of the drawings, and practice of the invention. For example, while only one RSVP proxy has been shown, more than one RSVP proxy can be included in a network. Also, the functionality of the RSVP proxy can be included in the receiver device, rather than a separate physical entity on the network. The specification and drawings are, accordingly, to be regarded in an illustrative rather than a restrictive sense. The embodiments and specific features described above in the specification and shown in the drawings should be considered exemplary rather than restrictive, with the invention being defined by the appended claims, which therefore include all such alternatives, modifications, permutations and equivalents as fall within the true spirit and scope of the present invention.

What is claimed is:

1. A method of initiating a reservation process using Resource Reservation Protocol (RSVP), comprising:

detecting a traffic flow in a communication network originating from a source and directed to a receiver of the traffic flow; and in response to detecting the traffic flow, performing the steps of:
   determining whether to initiate an RSVP reservation process for the traffic flow based upon characteristics of the traffic flow,
   generating an RSVP PATH message that requests reservation of resource for processing the traffic flow,
   communicating the RSVP PATH message to the receiver of the traffic flow, and
   wherein determining whether to initiate an RSVP reservation process includes:
   determining whether an RSVP PATH message is already associated with the traffic flow.

2. A method as recited in claim 1, further comprising determining device and traffic parameters associated with the traffic flow, wherein generating the RSVP PATH message is based, at least in part, on at least one of the device and traffic parameters.

3. A method as recited in claim 1, further comprising identifying and acquiring a predetermined policy, wherein generating the RSVP PATH message is based, at least in part, on the predetermined policy.

4. A method as recited in claim 1, wherein determining whether to initiate an RSVP reservation process includes:

determining one or more values of network parameters associated with the traffic flow, transport parameters associated with the traffic flow, or traffic flow characteristics; and correlating at least one of the ascertained values of network parameters, transport parameters, or traffic flow characteristics with predetermined relationships between them and whether an RSVP PATH message is desired.

5. A method as recited in claim 4, wherein ascertaining values of the network parameters includes ascertaining at least one of the source and receiver IP addresses or source and receiver port numbers.

6. A method as recited in claim 4, wherein ascertaining the traffic flow characteristics includes ascertaining at least one of the rate or size of packets associated with the traffic flow.

7. A method as recited in claim 4, further comprising inspecting the traffic flow packets to ascertain additional traffic flow attributes.

8. A method as recited in claim 7, wherein the traffic flow is a voice session from an IP phone source, and further comprising intercepting a call setup protocol contained within the traffic flow and ascertaining at least one of the codec, user names, and importance associated with the traffic flow based on values obtained from the call setup protocol.

9. A method as recited in claim 7, wherein the traffic flow is configured in accordance with an FTP protocol, and further comprising ascertaining at least one of the user name, file name, and file size associated with the traffic flow.

10. A computer readable medium containing program instructions for initiating a reservation process using Resource Reservation Protocol (RSVP), the program instructions, when executed by a processor, cause the processor to perform the steps of:

detecting a traffic flow in a communication network, originating from a source directed to a receiver of the traffic flow; and in response to detecting the traffic flow, performing the steps of:
    determining whether to initiate an RSVP reservation process for the traffic flow based upon characteristics of the traffic flow,
    generating an RSVP PATH message that requests reservation of resource for processing the traffic flow,
    communicating the RSVP PATH message to the receiver of the traffic flow, and
    wherein determining whether to initiate an RSVP reservation process includes:
    determining whether an RSVP PATH message is already associated with the traffic flow.

11. A computer readable medium as recited in claim 10, the steps further comprising determining device and traffic parameters associated with the traffic flow, wherein the program instructions for generating the RSVP PATH message are based, at least in part, on at least one of the device and traffic parameters.

12. A computer readable medium as recited in claim 10, the steps further comprising identifying and acquiring a predetermined policy, wherein generating the RSVP PATH message is based, at least in part, on the predetermined policy.

13. A computer readable medium as recited in claim 10, wherein determining whether to initiate an RSVP reservation process includes:

determining one or more values of network parameters associated with the traffic flow, transport parameters associated with the traffic flow, traffic flow characteristics; and correlating at least one of the determined values of network parameters, transport parameters, and traffic flow characteristics with predetermined relationships between them and whether an RSVP PATH message is desired.

14. A computer readable medium as recited in claim 10, wherein the traffic flow is a voice session from an IP phone source, the steps further comprising intercepting a call setup protocol contained within the traffic flow and ascertaining at least one of the codec, user names, and importance associated with the traffic flow based on values obtained from the call setup protocol.

15. A computer readable medium as recited in claim 10, the steps further comprising inspecting the traffic flow packets to ascertain at least one of the user name, file name, and file size associated with the traffic flow when the traffic flow is configured in accordance with an FTP protocol.

16. A system for initiating an RSVP reservation process, for a traffic flow originating from a source, comprising:
   an RSVP proxy configured to be networked with a sender device and with a receiver device, wherein the sender device is configured to originate a traffic flow and send the traffic flow to a receiver device, and including:
      a detector configured to detect the traffic flow when networked with the sender and receiver devices;
      an analyzer configured to determine attributes of the traffic flow when networked with the sender and receiver devices;
      an RSVP PATH message generator configured to, in response to the detector detecting the traffic flow and based upon the determined attributes of the traffic flow, generate one or more RSVP PATH messages that request reservation of resource for processing the traffic flow;
   wherein the RSVP proxy is further configured to be networked to a policy server; and
   wherein the RSVP PATH message generator is configured to determine whether to send an RSVP PATH message based on a policy from the policy server.

17. A system as recited in claim 16, wherein the detector is configured to detect the traffic flow when the RSVP proxy is not physically in the communication path between the sender device and the receiver device.

18. A system as recited in claim 17, wherein the analyzer is configured to determine network and transport parameters associated with the traffic flow, and to inspect packets of the traffic flow to determine application-specific attributes of the traffic flow.

19. A system for initiating an RSVP reservation process, for a traffic flow originating from a source, comprising:
   an RSVP proxy configured to be networked with a sender device and with a receiver device;
   wherein the sender device is configured to originate a traffic flow and send the traffic flow to a receiver device; and
   wherein the RSVP proxy is further configured to:
      detect and interpret the traffic flow, and
      in response to detecting and interpreting the traffic flow:
         generate, based upon characteristics of the traffic flow, an RSVP PATH message that requests reservation of resource for processing the traffic flow,
         determine whether an RSVP PATH message is already associated with the traffic flow, and
         send an RSVP PATH message based upon characteristics of the traffic flow.

20. A system for initiating a reservation process using Resource Reservation Protocol (RSVP), comprising:
   means for detecting a traffic flow in a commumication network, originating from a source and directed to a receiver of the traffic flow; and means for, in response to detecting the traffic flow:
      determining whether to initiate an RSVP reservation process for the traffic flow based upon characteristics of the traffic flow,
      generating an RSVP PATH message that requests reservation of resource for processing the traffic flow,
      communicating the RSVP PATH message to the receiver of the traffic flow, and
      wherein the means for determining whether to initiate an RSVP reservation process includes:
         means for determining whether an RSVP PATH message is already associated with the traffic flow.

21. A system as recited in claim 20, further comprising means for determining device and traffic parameters associated with the traffic flow, wherein the means for generating the RSVP PATH message is configured to generate the RSVP PATH message on at least one of the device and traffic parameters.

22. A system as recited in claim 20, further comprising means for identifying and acquiring a predetermined policy, wherein the means for generating the RSVP PATH message is configured to generate the RSVP PATH message on the predetermined policy.

23. A system as recited in claim 20, wherein the means for determining whether to initiate an RSVP reservation process includes:
   means for determining one or more values of network parameters associated with the traffic flow, transport parameters associated with the traffic flow, or traffic flow characteristics; and
   means for correlating at least one of the determined values of network parameters, transport parameters, or traffic flow characteristics with predetermined relationships between them and whether an RSVP PATH message is desired.

24. A system as recited in claim 23, wherein the means for determining one or more values of the network parameters includes means for determining at least one of the source and receiver IP addresses or source and receiver port numbers.

25. A system as recited in claim 23, wherein the traffic flow characteristics includes at least one of the rate or size of packets associated with the traffic flow.

26. A system as recited in claim 23, further comprising means for inspecting the traffic flow packets to determine additional traffic flow attributes.

27. A system as recited in claim 26, wherein the traffic flow is a voice session from an IP phone source, and further comprising means for intercepting a call setup protocol contained within the traffic flow and ascertaining at least one of the codec, user names, and importance associated with the traffic flow based on values obtained from the call setup protocol.

28. A system as recited in claim 26, wherein the traffic flow is configured in accordance with an FTP protocol, and further comprising means for determining at least one of the user name, file name, and file size associated with the traffic flow.

* * * * *

UNITED STATES PATENT AND TRADEMARK OFFICE
CERTIFICATE OF CORRECTION

PATENT NO. : 6,721,272 B1  Page 1 of 1
DATED : April 13, 2004
INVENTOR(S) : Itzhak Parnafes et al.

It is certified that error appears in the above-identified patent and that said Letters Patent is hereby corrected as shown below:

<u>Column 14,</u>
Line 3, replace "commumunication" with -- communication --

Signed and Sealed this

Twenty-seventh Day of July, 2004

JON W. DUDAS
*Acting Director of the United States Patent and Trademark Office*